United States Patent [19]

Van Loan

[11] 3,868,334

[45] Feb. 25, 1975

[54] RESISTIVE GLAZE AND PASTE COMPOSITIONS

[75] Inventor: Paul R. Van Loan, Placentia, Calif.

[73] Assignee: Airco, Inc., New York, N.Y.

[22] Filed: Apr. 21, 1972

[21] Appl. No.: 246,348

Related U.S. Application Data

[63] Continuation-in-part of Ser. No. 82,161, Oct. 19, 1970, Pat. No. 3,682,840.

[52] U.S. Cl................. 252/520, 106/49, 106/53, 252/518, 117/201
[51] Int. Cl......... H01b 1/08, C03c 3/08, C03c 3/10
[58] Field of Search.......... 106/48, 49, 53; 252/578, 252/520; 117/201

[56] References Cited

UNITED STATES PATENTS

| | | | |
|---|---|---|---|
| 3,304,199 | 2/1967 | Faber, Sr. et al. | 106/49 |
| 3,573,229 | 3/1971 | Herbst et al. | 252/518 |
| 3,654,505 | 4/1972 | Davis et al. | 106/53 |
| 3,673,117 | 6/1972 | Schroeder et al. | 252/578 |
| 3,682,840 | 8/1972 | Van Loan | 106/53 |

*Primary Examiner*—Winston A. Douglas
*Assistant Examiner*—Mark Bell
*Attorney, Agent, or Firm*—Larry R. Cassett; H. Hume Mathews; Edmund W. Bopp

[57] ABSTRACT

Resistive glazes and paste compositions for firing into such glazes, including a ruthenium dioxide-based conductant and a glass including specified proportions of selected oxides of lead, zinc, manganese, boron, silicon, and zirconium. Additional quantities of antimony and vanadium pentoxides may be added as TCR modifiers, as may ceric oxide, which serves as a viscosity control agent during firing. A temporary liquid binder is present in the paste composition to bind the composition prior to firing to a glaze.

13 Claims, No Drawings

RESISTIVE GLAZE AND PASTE COMPOSITIONS

This application is a continuation - in - part of my copending application, Ser. No. 82,161, filed Oct. 19, 1970, and entitled "Electrical Resistor Containing Lead Ruthenate", which application is now U.S. Pat. No. 3,682,840.

BACKGROUND OF INVENTION

This invention relates generally to electroconductive compositions, and more specifically relates to compositions suitable for firing into resistive glazes, and to the resistive glazes themselves.

Within recent years, researchers, in response to the requirements of solid state technology, have developed numerous glass-bonded electrically resistive products, which are often broadly identified by the term "resistive glazes." Such products are typically prepared by high temperature firing of paste-like compositions including a particulate conductant —frequently a conductive or semi-conductive metal oxide—, in admixture with a glass frit and a suitable temporary binder. Desired resistive elements may be formed from the paste products by overcoating or screen printing a refractory substrate with a desired pattern prior to firing; or similarly, volumetric resistors may be prepared by forming the paste into a block or cylinder form prior to firing thereof. The resultant product in each instance is a glass-like element in which the particular conductant is dispersed with relative uniformity in a fused glass matrix.

Among those relative glazes which have proved most successful, are those based upon use of ruthenium dioxide alone as the conductive component, or upon the combination of the oxides of ruthenium and another metal in admixture or chemical combination such as disclosed in U.S. Pat. No. 3,352,797 and my said U.S. Pat. No. 3,682,840.

Such glazes have generally acceptable TCR characteristics (Thermal Coefficient of Resistance), acceptable noise characteristics, and display a good range of useable resistive values. To the extent that these compositions of the prior art have proved objectionable, such shortcomings have largely been due to one or both of two factors:

Firstly, it is known that many ruthenium based compositions simply trade off unacceptably high sheet resistances for low TCR's or vice-versa, or trade off one or both of these criteria for low noise levels. Secondly, particularly in those compositions wherein one uses low concentrations of $RuO_2$ (for high resistance value) reproducibility and stable electrical properties are sharply curtailed. Further, the very high cost of ruthenium therefore generates an obvious interest in using as little thereof as is practical.

In accordance with the foregoing, it may be regarded as an object of the present invention, to provide a ruthenium oxide-based composition which provides an optimum combination of properties, with respect to stability, TCR, sheet resistance, and noise levels, in resistive glazes derived therefrom.

It is a further object of the invention, to provide a ruthenium oxide-based composition which may incorporate relatively low quantities of expensive ruthenium, and which yet provides highly reproducible resistive glaze products possessing excellent combinations of TCR, sheet resistances, and noise level properties.

It is still an additional object of the present invention, to provide resistive glazes incorporating ruthenium dioxide and/or metal ruthenates, which possess outstanding combinations of TCR, sheet resistance, and noise level properties.

SUMMARY OF INVENTION

Now in accordance with the present invention, the foregoing objects, and others as will become apparent in the course of the ensuing specification, are achieved in a paste composition including as conductant finely divided ruthenium dioxide, and a glass frit comprising specified proportions of oxides of lead, zinc, manganese, boron, silicon, and zirconium. Additional quantities of antimony and/or vanadium pentoxides may be incorporated as TCR modifiers, as may ceric oxide, which serves as a viscosity control agent during firing. A temporary liquid binder is present in the paste composition to bind such composition prior to firing to a glaze. The resistive glaze products resulting from firing of the specified composition are thereupon found to possess outstanding combinations of electrical properties with respect to TCR, sheet resistances, and exhibited noise levels, and by virtue of the formulations utilized, reproducibility and dependability for the glaze products is equally outstanding.

DESCRIPTION OF PREFERRED EMBODIMENTS

In order to fully appreciate the problem to which the present invention addresses itself, the following Example I sets forth comparative test results for the fired products of four pastes prepared from commercially available glasses vis-a-vis equivalent tests with one formulation of the present invention. The composition of the invention so utilizd is referred to in Example I by the designation "VL-1":

EXAMPLE I

A series of five resistive pastes was prepared by mixing 25 weight percent hydrated ruthenium dioxide with 75 weight percent of each of five glasses, plus sufficient organic vehicles to render the paste thixotropic and screen-printable. As organic vehicles a typical solution comprised a 10 percent solution of ethyl cellulose in butyl carbitol. Each of these pastes was screened in an identical pattern on sintered 96 percent alumina substrates, dried, and fired through a moving belt tunnel kiln with an 18 minute total firing time, including 3 minutes at a peak temperature of 750° or 800°C. The fired thick films were then found to have the following electrical properties:

| Glass | Sheet Resistance ohms/square | TCR ppm/°C | Current Noise db/decade |
|---|---|---|---|
| Commercial Grade 1 | 200 | 250 | −29.0 |
| Grade 2 | 10 | 1235 | −33.0 |
| Grade 3 | 50 | 1000 | −26.1 |
| Grade 4 | 7,000 | 30 | −1.2 |
| "VL-1" | 40 | 300 | −30.0 |

The glasses utilized in the foregoing Example are all borosilicates, most of them lead borosilicates. It is this family of glasses which is preferred by those skilled in the art of cermet paste formulations. It will be noted, however, that there is a great variety in the electrical properties obtained by mixing identical quantities of $RuO_2$ with different lead borosilicate glasses. The "VL—1" glass of the invention is particularly favorable in that it provides an outstanding combination of sheet resistance, TCR and noise properties in the fired films. Other frits (Grade 2, for example), yield lower sheet resistances but much higher TCR's; conversely frits such as Grade 4 produce films with good TCR's but very high sheet resistances for such a high concentration of RuO$_2$.

In accordance with the invention, the "VL-1" glass utilized in Example I had an approximate composition by weight as follows: PbO 65%, ZnO 5.5%, MnO 2.5%, B$_2$O$_3$ 12%, SiO$_2$ 13.0%, and ZrO$_2$ 2.0%. Nearly identical properties were found in a composition otherwise similar but wherein B$_2$O$_3$ was present as 16% by weight and SiO$_2$ as 9.0% by weight. More generally, however, it is found that a favorable composition for the glass component of the invention includes the several components in the range: PbO 55 to 75%, ZnO 2 to 10%, MnO 2 to 10%, B$_2$O$_3$ 5 to 20%, SiO$_2$ 5 to 20%, and ZrO$_2$ 0 to 5%.

Each component of the aforesaid glass has a particular function in the composition. The glass is basically a borosilicate, since these glasses are known to promote the electrically conducting textures which are required in thick film glaze resistors. The ZnO moderates the CTE of the glaze, thus minimizing thermal expansion mismatch between glaze film and substrate. The MnO component is believed to be significant in lowering the highly positive TCR, which RuO$_2$-glaze composites exhibit, without affecting other properties such as sheet resistance and current noise. The ZrO$_2$ component is known to provide a higher viscosity in the melted glass frit. This ensures, that, during firing, the screened pattern retains its sharpness and does not "bleed out" or flow on the substrate.

While, as has thus far been indicated, the starting component for the particulate conductant of the invention, is normally ruthenium dioxide, it will be appreciated that intermetallic ruthenates, may be formed in situ during firing and so be present in the finished glaze. It is also in accordance with the invention to utilize as conductants in the paste, previously synthesized metallic ruthenates, such as the lead ruthenate taught in the said application, or mixtures of a metal ruthenate with RuO$_2$.

The compositions of the invention thus far set forth, while displaying good electrical properties, yet retain TCR's which for some applications are higher than is desirable. In this connection it has been found that addition of small quantities of V$_2$O$_5$ and particularly of Sb$_2$O$_5$ have marked beneficial effects on the said TCR's:

EXAMPLE II

Resistive pastes were prepared by mixing the following:

| Component | Weight in grams | | | |
|---|---|---|---|---|
| | 1 | 2 | 3 | 4 |
| "VL-1" glass frit | 9.09 | 8.45 | 9.30 | 9.09 |
| RuO$_2$ | 0.50 | 0.75 | 0.30 | 0.50 |
| V$_2$O$_5$ | — | 0.40 | — | — |
| Sb$_2$O$_5$ | 0.01 | — | — | .007 |
| CaF$_2$ | 0.40 | 0.40 | 0.40 | 0.40 |
| 10% Ethyl Cellulose soln. | 1.0 | 1.0 | 1.0 | 1.0 |
| Butyl Carbitol | 1.6 ml | 1.6 ml | 1.2 ml | 1.3 ml |

The presence of CaF$_2$ in this Example, serves to secure a smooth surface texture on the fired film. These pastes were all printed on sintered alumina substrates, dried, and fired at a peak temperature of 800°C, for a total firing cycle time of 18 minutes. The electrical properties of the fired pastes were as follows:

| Paste | RuO$_2$ % | Additive % | R ohms/sq | TCR ppm/°C | Noise db/dec. | %ΔR/1000 hrs. at 150°C |
|---|---|---|---|---|---|---|
| 1 | 5 | 0.1 Sb$_2$O$_5$ | 2,100 | −2 | −11.1 | 0.14 |
| 2 | 7.5 | 4 V$_2$O$_5$ | 350 | 95 | −28.3 | <0.2 |
| 3 | 3 | — | 800 | 340 | −27.2 | 0.30 |
| 4 | 5 | 0.07 Sb$_2$O$_5$ | 475 | 240 | −31 | <0.2 |

As is seen in Example II, the unmodified "VL-1" RuO$_2$ system even with as little as 3 weight percent RuO$_2$, has a strongly positive TCR. Both V$_2$O$_5$ and Sb$_2$O$_5$ are effective in lowering the TCR to within 100 ppm, as Paste No. 1 and 2 show, but as the data indicate, even very small additions (<<1%) of Sb$_2$O$_5$ have a marked effect on the electrical properties, shifting the TCR in a more negative direction, (compare the TCR's of Paste No. 3 and 4) and increasing the resistance and noise level. The very high stability of the pastes is, furthermore, quite evident from the last column of the Example.

It has been further found that in paste compositions containing little RuO$_2$ (and therefore chiefly glass frit, with or without CaF$_2$), the screened pattern tended to spread, i.e. "bleed out" on firing. The presence of CaF$_2$ while helpful in controlling bubbling of the film surface on firing, worsened the spread by lowering the molten glass viscosity. It was found, however, that small -preferably about 5 percent, but up to 20% by weight- additions of finely divided CeO$_2$ to the paste raised the viscosity of the system without adversely affecting the electrical properties of the fired films.

While the present invention has been particularly set forth in terms of specific embodiments thereof, it will be understood in view of the instant disclosure, that numerous variations upon the invention are now enabled to those skilled in the art, which variations, in propriety, are yet within the true scope of the present teaching. Accordingly the present invention is to be broadly construed, and limited only by the scope and spirit of the claims now appended hereto.

I claim:

1. A composition for firing into a resistive glaze, comprising in admixture:
   as a conductant, finely divided RuO$_2$;
   a glass frit consisting by weight of 55 to 75% PbO, 2 to 10% ZnO, 2 to 10% MnO, 5 to 20% SiO$_2$, 5 to 20% B$_2$O$_3$, and 0 to 5% ZrO$_2$; and
   a temporary liquid binder for said conductant and frit components.

2. A composition according to claim 1, wherein the components of said glass frit are present in the approximate proportions by weight of PbO 65%, ZnO 5.5%, MnO 2.5%, $B_2O_3$ 12 to 16%, $SiO_2$ 9 to 13%, and $ZrO_2$ 2%.

3. A composition according to claim 1, further including as a TCR modifier, less than 4 percent by weight of an additive selected from the group consisting of $V_2O_5$, $Sb_2O_5$, and mixtures thereof, said additive being present in an amount sufficient to lower the TCR in the fired resistive glaze below that found in the absence thereof.

4. A composition according to claim 1, further including as a viscosity control agent during firing, less than 20% by weight of the solid constituents of said composition, of finely divided $CeO_2$.

5. A composition according to claim 3, wherein said $RuO_2$ is present as less than 10 percent by weight of the solid components of said composition.

6. A composition according to claim 5, further including as a viscosity control agent during firing, less than 20 percent by weight of the solid constituents of said composition, of finely divided $CeO_2$.

7. A fired, electrically resistive glaze composition, comprising: finely divided particles of a conductant selected from the group consisting of $RuO_2$, a metal ruthenate and mixtures thereof, uniformly dispersed in a fused glass matrix, said matrix consisting by weight of 55 to 75% PbO, 2 to 10% ZnO, 2 to 10% MnO, 5 to 20% $SiO_2$, 5 to 20% $B_2O_3$, and 0 to 5% $ZrO_2$.

8. A product according to claim 7, wherein the components of said glass matrix are present in the approximate proportions by weight of PbO 65%, ZnO 5.5%, MnO 2.5%, $B_2O_3$ 12 to 16%, $SiO_2$ 9 to 13%, and $ZrO_2$ 2%.

9. A product according to claim 7, further including as a TCR modifier, less than 4 percent by weight of an additive selected from the group consisting of the $V_2O_5$, $Sb_2O_5$ and mixtures thereof, said additive being present in amounts sufficient to lower the TCR in the fired resistive glaze below that found in the absence thereof.

10. A product according to claim 7, further including less than 20% by weight of $CeO_2$.

11. A product according to claim 9, wherein said conductant is present as less than 10% by weight of said composition.

12. A product according to claim 11, further including less than 20% by weight of $CeO_2$.

13. A composition for firing into a resistive glaze, comprising in admixture;
a finely divided conductant selected from the group consisting of a metal ruthenate, $RuO_2$, and mixtures of the two;
a glass frit consisting by weight of 55 to 75% PbO, 2 to 10% ZnO, 2 to 10% MnO, 5 to 20% $SiO_2$, 5 to 20% $B_2O_3$, and 0 to 5% $ZrO_2$; and
a temporary liquid binder for said conductant and frit components.

* * * * *

UNITED STATES PATENT OFFICE
CERTIFICATE OF CORRECTION

PATENT NO. : 3,868,334
DATED : February 25, 1975
INVENTOR(S) : Paul R. Van Loan

It is certified that error appears in the above-identified patent and that said Letters Patent are hereby corrected as shown below:

Column 1, line 31, "relative" should be --resistive--

Column 2, line 35, "utilizd" should be --utilized--

Signed and sealed this 24th day of June 1975.

(SEAL)
Attest:

RUTH C. MASON
Attesting Officer

C. MARSHALL DANN
Commissioner of Patents
and Trademarks